UNITED STATES PATENT OFFICE.

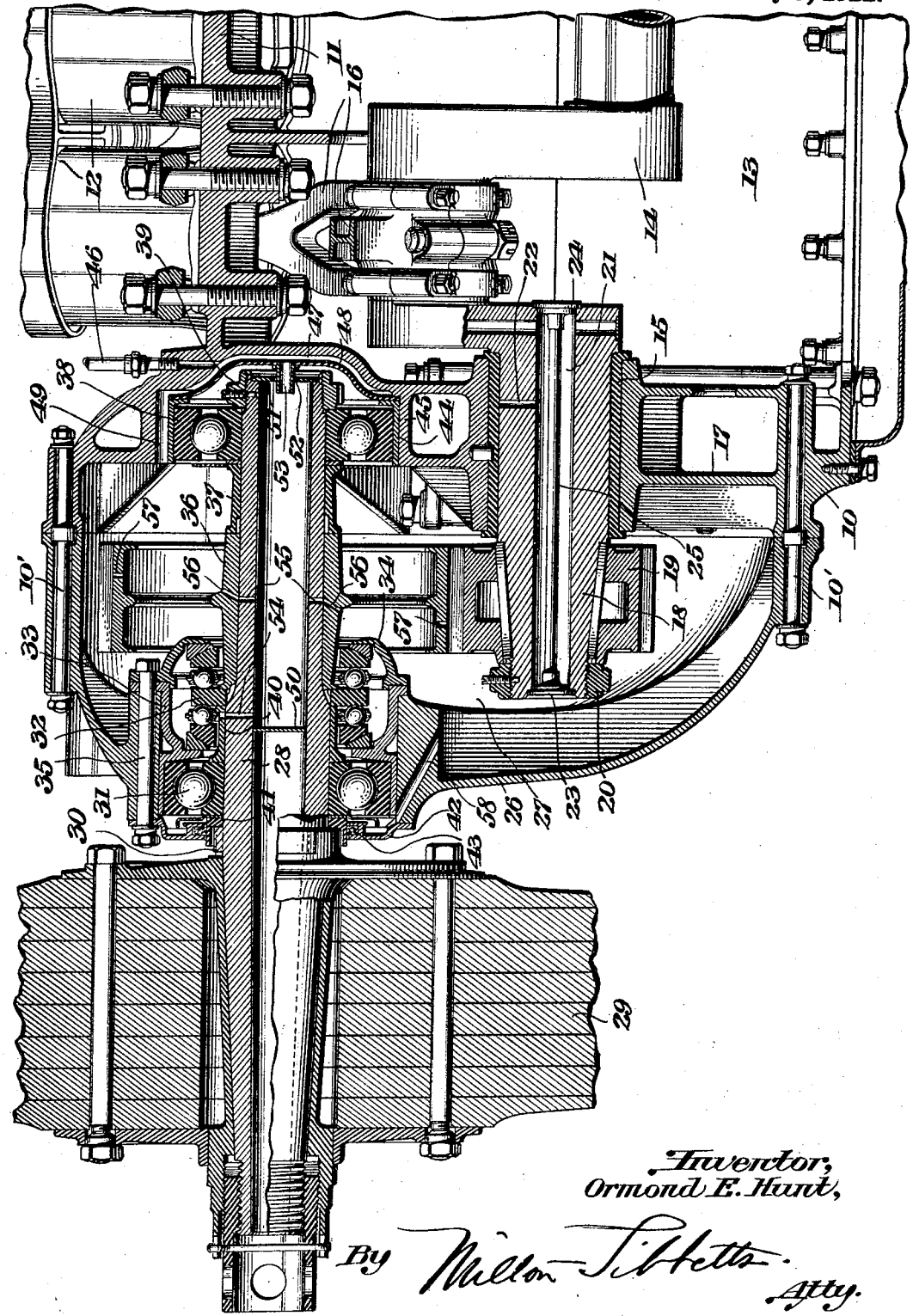

ORMOND E. HUNT, OF DETROIT, MICHIGAN, ASSIGNOR TO PACKARD MOTOR CAR COMPANY, OF DETROIT, MICHIGAN, A CORPORATION OF MICHIGAN.

PROPELLER DRIVE FOR HYDROCARBON MOTORS.

1,415,092.

Specification of Letters Patent.   Patented May 9, 1922.

Application filed April 27, 1918. Serial No. 231,236.

*To all whom it may concern:*

Be it known that I, ORMOND E. HUNT, a citizen of the United States, and resident of Detroit, Wayne County, State of Michigan, have invented certain new and useful Improvements in Propeller Drives for Hydrocarbon Motors, of which the following is a specification.

This invention relates to hydrocarbon motors and particularly to the reduction gearing between the crank shaft thereof and a propeller shaft, and the mounting of the parts.

One of the objects of the invention is to provide a construction that will permit of unit assembly to thereby facilitate manufacture.

Another object of the invention is to provide lubrication means for the driving mechanism of a hydrocarbon motor.

Another object of the invention is to provide a separate compartment for the reduction gearing and the bearings thereof, to prevent the moisture of the crank case from rusting the bearings or other parts.

Other objects of the invention will appear from the following description taken in connection with the drawing which forms a part of this specification, and in which the figure is a vertical longitudinal sectional view through one end of a hydrocarbon motor embodying the invention.

Referring to the drawing, 10 represents the forward part of a hydrocarbon motor crank case or base. As shown, this crank case or base 10 is formed in two halves, the upper half 11 supporting the cylinders 12, and the lower half 13 forming an oil well. The crank shaft 14 of the motor is mounted in bearings between the upper and lower halves of the crank case, and the forward bearing 15 is shown in section in the drawing. The drawing also shows two of the connecting rods 16 mounted on one of the cranks of the crank shaft 14, it being understood that the motor shown is of the V-type.

The bearing 15 above referred to is supported directly in the forward end wall 17 of the crank case or base 10 and the crank shaft 14 extends through and beyond this bearing, the extended end being indicated at 18. Upon this extended end is mounted a spur gear 19, keyed thereto and secured thereon by a nut 20.

It will be seen that this end of the crank shaft 14 is drilled out as at 21 and a branch passage 22 is provided for carrying oil to the bearing 15. Oil may be fed under pressure to the interior of the crank shaft by any suitable means (not shown) and the ends of the drilled-out part 21 of the crank shaft may be closed as by disks 23 and 24, and a tie rod 25.

Detachably secured to the front wall of the base or crank case 10 as by bolts 10', is a cover 26 which is shown as of bulged-out construction and formed so that together with the front wall of the crank case it forms a compartment or housing 27 forwardly of the crank case and into which the end 18 of the crank shaft extends. By reason of the separation of this compartment from the crank case by the front wall of the latter, any moisture that may be in the crank case is prevented from circulating in the compartment 27 where it might injure the bearings and other parts therein as by rusting them.

The cover 26 is arranged to rotatably support a propeller shaft 28, which shaft extends through the cover and has an airplane propeller 29 securely keyed to its front end. The rearward part of the propeller shaft 28 is shown as housed within the compartment 27.

The propeller shaft 28 has a flange 30, which is shown as an integral part of the shaft, and upon a cylindrical part of the shaft adjacent said flange are bearings 31 and 32. These bearings may be broadly termed "roller bearings," which is intended to include bearings having either balls or cylindrical or conical or similar rollers, and the bearing 31 is an annular bearing while the bearing 32 is a double thrust bearing. These two bearings are supported in the cover 26 by means of collars 33 and 34, both of which are secured to the cover 26 as by a series of bolts 35.

Just rearwardly of the bearing 32 is a large spur gear 36, the hub of which is keyed to the shaft 28. Then there is a spacing collar 37 and then another annular roller bearing 38. A nut 39 threaded on the rear end of the shaft 28 bears against the inner race of the bearing 38 and thereby retains the various bearings and the gear 36 in place on the shaft. A spacing collar 40 between the inner race of the bearing 31 and the intermediate race of the bearing 32, and a flanged ring 41 between the flange 30 and the inner race of the bearing 31, complete the various parts mounted on the shaft 28. A plate 42 fits on the cover 26 over the opening through which the shaft 28 passes and has a packing 43 which makes a joint with the periphery of the ring 41 to prevent the escape of lubricant around the shaft. This plate 42 is secured to the cover by the bolts 35 above referred to.

From the above description it will be seen that the shaft 28 and all of its bearings and its gear and propeller may be assembled with the cover 26 independently of the motor crank case 10 and afterwards secured in place on the end of said crank case. This considerably facilitates manufacture of these parts.

The front wall of the upper half 11 of the crank case 10 is formed with a bearing receiving part 44 into which is placed a lining shell 45 adapted to receive the bearing 38 of the shaft 28. It will be understood that when the cover 26 is placed in position at the front end of the crank case the bearing 38 is slipped into the shell 45 and said bearing is to be supported by the crank case or base. As this cover is placed in position the gears 36 and 19 are brought into mesh so that the shaft 28 is driven at a reduced speed by the crank shaft 14.

Means are provided for feeding oil to the various moving parts in the compartment 27 and as shown one of the oil leads from the motor brings the oil to the compartment as by a pipe 46. This pipe carries the oil to a space 47 formed by the wall of the crank case and a plate 48 arranged just at the rear of the shaft 28 and held in place by the shell 45. An overflow conduit 49 may be provided if desired at the top of the space 47. The shaft 28 is of hollow construction and oil which may be fed to the rear part of the shaft is prevented from reaching the forward part by a partition in the form of a disk 50 which is pressed into the shaft as shown in the drawing. The rear end of the shaft has a disk 51 secured thereto and a central opening 52 permits the passage of a tube 53 which provides communication between the space 47 and the interior of the shaft 28. Thus the oil fed by the pipe 46 to the space 47 passes through the tube 53 into the rear part of the shaft 28. Any overflow from the passage 49 drains down to the bottom of the compartment 27 where it may be withdrawn with suitable pump connections, not shown. Some of this overflow lubricates the bearing 38.

The shaft 28 is also formed with branch oil conduits 54 and 55, the former leading to the bearings 32 and 31 and the latter communicating with conduits 56 formed in the hub of the gear 36. These latter conduits throw the oil by centrifugal force onto the inner periphery of the gear 36 from which it passes to the gear teeth through openings 57.

Some of the oil that passes to the bearings 31 and 32 drains to the bottom of the compartment 27 through a drain conduit 58 and the remainder overflows at the end of the collar 34.

From the above description it will be seen that there is a constant circulation of oil through the various bearings and over the gears so that all moving parts within the compartment 27 are amply lubricated.

Other forms and modifications of the mechanism shown and described herein may be made without departing from the spirit or scope of the invention.

Having thus described my invention, what I claim and desire to secure by Letters Patent is:

1. The combination with the base and crank shaft of a hydrocarbon motor, of a cover detachably secured to said base and with the base forming a compartment, a propeller shaft extending through the cover, radial and thrust bearings for the propeller shaft in said cover, a radial bearing in said base for the inner end of said propeller shaft, and gearing between said shafts.

2. The combination with a hydrocarbon motor having a crank shaft, of a propeller shaft geared to said crank shaft and having a flange between its ends, a supporting casing for said shafts, a propeller mounted on the propeller shaft at one side of said flange, and separated bearings mounted on the propeller shaft at the other side of said flange.

3. The combination with a hydrocarbon motor having a crank shaft, of a propeller shaft geared to said crank shaft and having a flange between its ends, a supporting casing for said shafts, a propeller mounted on the propeller shaft at one side of said flange, and radial and thrust bearings mounted on the propeller shaft at the other side of said flange.

4. The combination with a hydrocarbon motor having a base, of a hollow propeller shaft mounted in bearings therein, a gear on said shaft, means for feeding oil to the interior of said shaft, and means for feeding oil from said shaft to said bearings and to the teeth of said gear.

5. The combination with a hydrocarbon motor having a crank case including an end closing wall and a cover spaced from said wall, of a propeller shaft, a pair of separated radial bearings for said shaft in said cover and in said wall, a double thrust bearing between the radial bearings and a driving gear for the propeller shaft mounted thereon in the compartment formed by said cover and wall and between said thrust bearing and one of said radial bearings.

In testimony whereof I affix my signature.

ORMOND E. HUNT.